A. C. MORSE.
POTATO GRADER.
APPLICATION FILED MAR. 4, 1919.

1,321,661.

Patented Nov. 11, 1919.
3 SHEETS—SHEET 1.

WITNESSES

INVENTOR
A. C. Morse.
BY
ATTORNEYS

A. C. MORSE.
POTATO GRADER.
APPLICATION FILED MAR. 4, 1919.
1,321,661.
Patented Nov. 11, 1919.
3 SHEETS—SHEET 2.
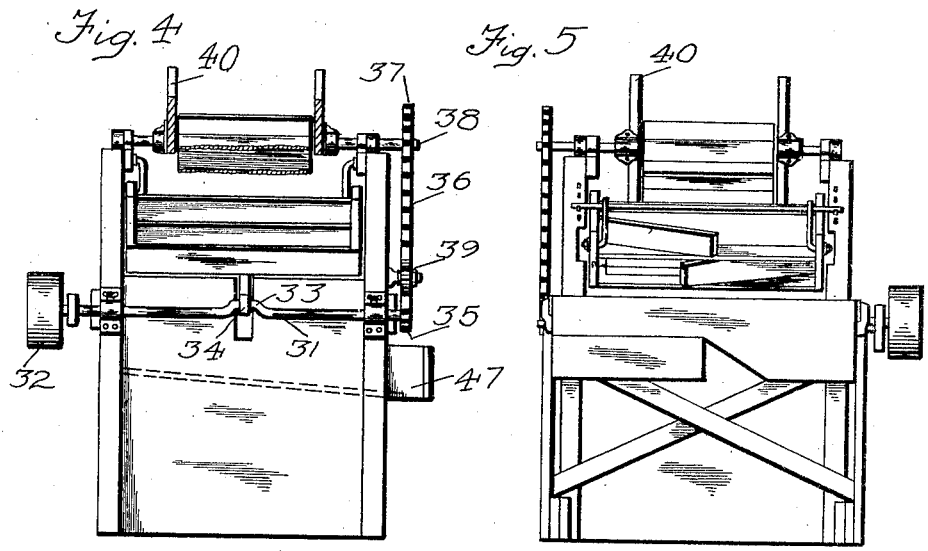
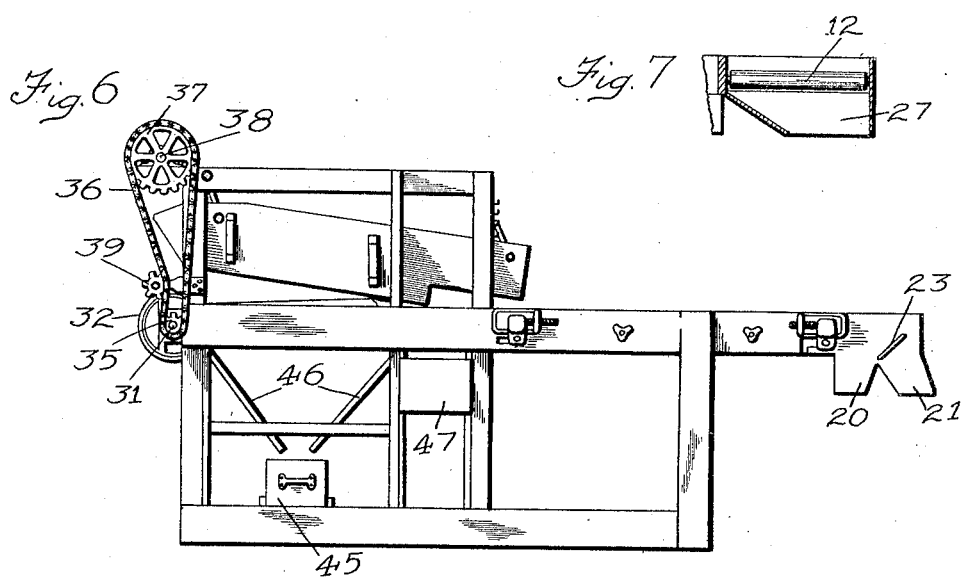
WITNESSES
INVENTOR
A. C. Morse
BY
ATTORNEYS

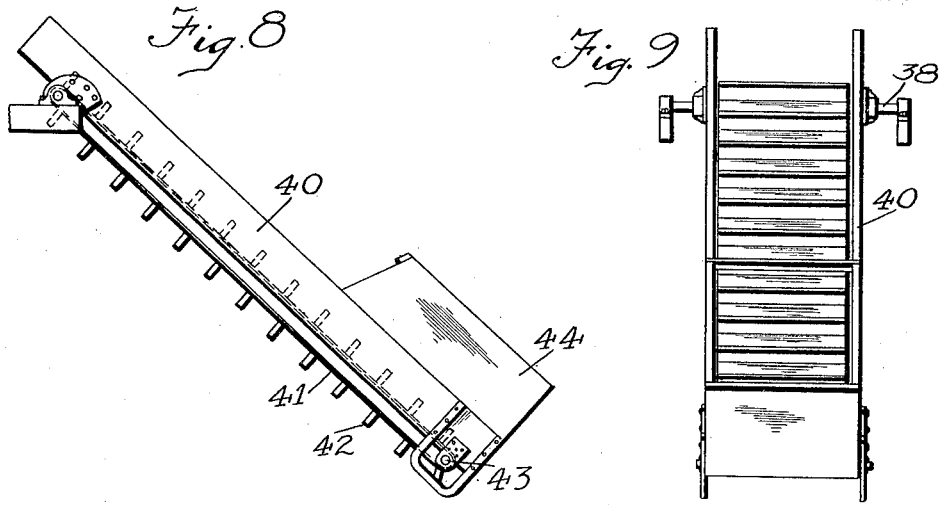
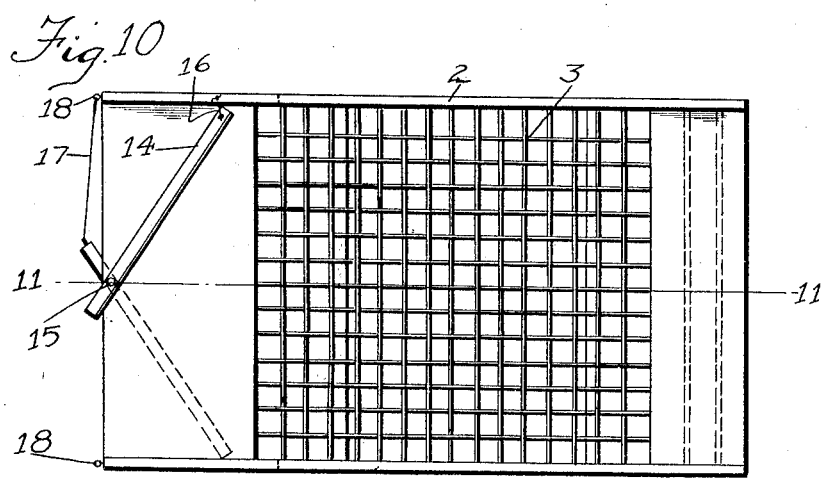

UNITED STATES PATENT OFFICE.

ARTHUR C. MORSE, OF ALMOND, WISCONSIN.

POTATO-GRADER.

1,321,661.  Specification of Letters Patent.  Patented Nov. 11, 1919.

Application filed March 4, 1919. Serial No. 280,532.

*To all whom it may concern:*

Be it known that I, ARTHUR C. MORSE, a citizen of the United States, and a resident of Almond, in the county of Portage and State of Wisconsin, have invented certain new and useful Improvements in Potato-Graders, of which the following is a specification.

My invention is an improvement in potato graders, and consists in certain novel constructions and combinations or parts hereinafter described and claimed.

In the drawings:—

Fig. 4 is an end view looking at the feed end with the feed conveyer in section.

Fig. 5 is a view looking at the opposite end,

Fig. 6 is a side view looking at the opposite side from Fig. 1,

Fig. 7 is a section on the line 7—7 of Fig. 2,

Fig. 8 is a side view of the feed conveyer,

Fig. 9 is a front view,

Fig. 10 is a top plan view of the riddle or sieve,

Fig. 11 is a section on the line 11—11 of Fig. 10.

Figure 1:
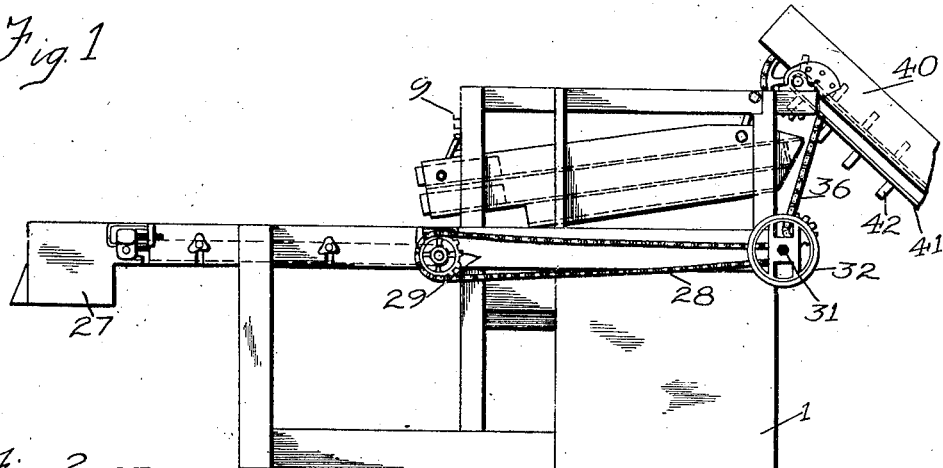
Figure 1 is a side view of the improved grader.
Figure 2:
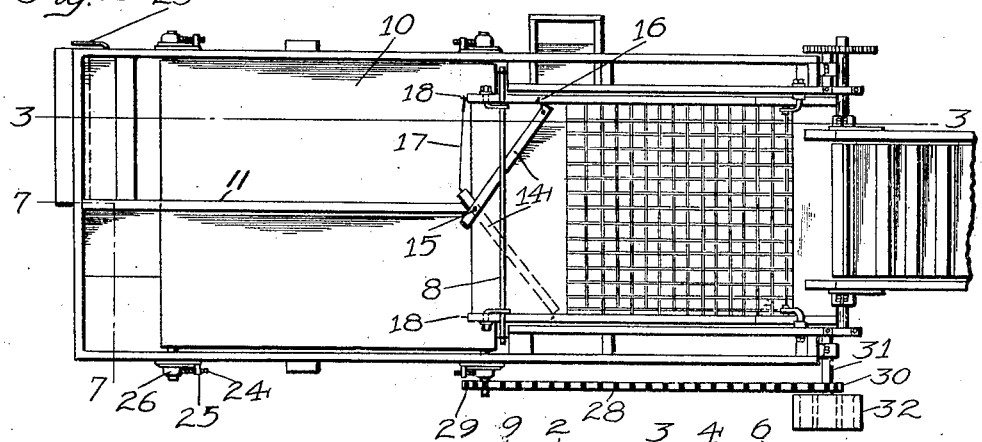
Fig. 2 is a top plan view.
Figure 3:
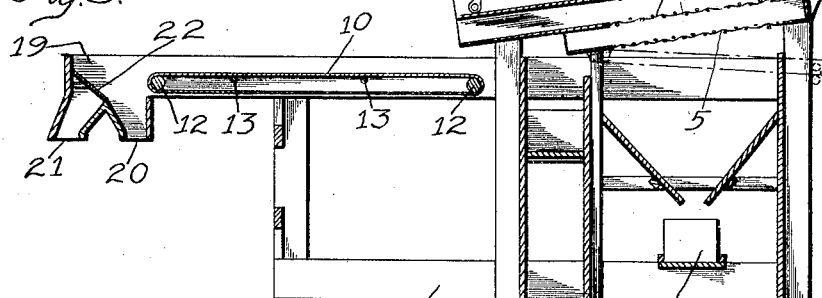
Fig. 3 is a section on the line 3—3 of Fig. 2.

In the present embodiment of the invention, a suitable frame 1 is provided, upon which is mounted a screen or riddle for swinging movement, the said screen or riddle as shown in Figs. 3 and 11, consisting of side members 2 which are connected by a series of screens, the said screens being indicated at 3, 4, and 5, and the screens are arranged in parallel spaced relation, one above the other, each delivering at its lower end.

Referring to Fig. 11 it will be noted that each screen has non-perforate plates at each end, and the riddle is supported from the frame 1 by means of links 6 pivoted at one end to the sides of the riddle and at the other to the frame 1.

The links 6 at the rear of the riddle are supported by a shaft 8, and this shaft is adapted to be mounted in hooks 9 arranged on the frame 1, so that the rear end of the riddle may be adjusted vertically to vary the inclination of the screens. The screen 3 is of largest mesh, and the screen 5 of smallest mesh, and the upper and lower screens 3 and 4 deliver to an endless carrier 10, supported in the frame in rear of the riddle. This conveyer is supported by rollers 12 and the upper run is supported by other rollers 13, all of said rollers being journaled in the frame 1, and a partition plate 11 is arranged at the center of the upper run of the conveyer.

Each plate is connected to the side toward which it is swung by means of a flexible member 16. The plate is further held by a flexible member 17 which is connected to the connected end of the plate, and has a hook for engaging an eye 18 at either side of the riddle. The conveyer 10 delivers to the outlet chute 19, which has branches 20 and 21, the branch 20 being in front of the branch 21, and both branches are open in order that a bag may be connected with the lower end of each.

A deflecting plate 22 is pivoted at the junction of the branches, to swing forwardly or rearwardly, to close either branch, and the plate is swung by means of a handle 23 connected therewith. The rollers 12 which support the conveyer 10 may move away from each other to tighten belts of the conveyers, by means of screws 24. These screws are threaded through lugs 25 on the frame, and engage movable bearings 26 in which the rollers are journaled.

The conveyer is driven by means of a sprocket chain 28, which connects a wheel 29 on the forward roller 12, to a wheel 30 on a shaft 31 journaled at the front of the frame. This shaft 31 carries a belt wheel or pulley 32, which may be connected to a suitable source of power. This shaft 31 has intermediate its ends a crank 33, and a link 34 connects the crank with the underside of the riddle, and the riddle is thus reciprocated or swung on its links 6.

At the opposite end from the pawl, the shaft 31 carries a sprocket wheel 35, which is connected by a chain 36 with a wheel 37 of the shaft 38 journaled on the frame above the inlet end of the riddle. An idler 39 engages one run of the chain for tightening the same, and upon the shaft 38 is mounted an endless conveyer frame 40.

This conveyer comprises an endless belt 41 having slats 42 which are perpendicular to the face of the belt, and the belt is supported by a roller on the shaft 38, and by a roller on the shaft 43 journaled at the opposite end of the frame.

At the feed end of the conveyer, side boards 44 are provided for extending upwardly on the sides of the frame. The lowermost screen 5 delivers to the receptacle 45 arranged below the same, and the dirt which passes from the screens is deflected into the container 45 by means of inclined deflecting plates 46. The container has a handle as shown in Fig. 6, by means of which it may be removed for emptying.

The potatoes which pass off the screen 5 at the lower end pass into an inclined trough 47 which is mounted just below the delivery end of the said screen, and the potatoes thus delivered are passed out at the side of the machine. It will be noted referring to Fig. 3 that the delivery end of the screen 5 is in front of the delivery end of the screens 3 and 4.

In operation, the potatoes to be graded are fed by the endless conveyers 41—42 to the uppermost screen 3. Those potatoes which are too large to pass through the meshes of the screen 3, roll off at the lower end thereof. These potatoes will be delivered to the conveyer 11.

Those potatoes which pass through the meshes of the screen 3, and are too large to pass through the meshes of the screen 4, will be delivered to the conveyer 10, while those potatoes which are small enough to pass through the meshes of the screen 4 and are too large to pass through the meshes of the screen 5 will be delivered to the outlet chute 47. The smallest potatoes, dirt, trash and the like will be delivered to the container 45.

I claim:—

A potato grader comprising a supporting frame, a riddle mounted for oscillatory movement longitudinally of said frame, said riddle including upper, lower and intermediate screens of different mesh, said lower screen being of less length than said upper and intermediate screens and the intermediate screen consequently projecting beyond the lower screen, the projecting portion of said intermediate screen being imperforate, a receptacle disposed below said lower screen and adapted to receive dirt and the like, a second receptacle disposed below the end of said lowermost screen in position to receive stones, trash, and excessively small potatoes, a traveling apron supported by said frame beneath the upper and intermediate screens in position to receive potatoes therefrom, a partition dividing said conveyer into two sections, and a deflecting board pivoted at the discharge end of said upper and intermediate screens whereby potatoes from said upper and intermediate screens will be discharged separately onto said conveyer at opposite sides of said partition, said deflecting board being reversible whereby the potatoes discharged from said upper and intermediate screens may be discharged onto said conveyer at selected sides of said partition.

ARTHUR C. MORSE.

Witnesses:
GAD JONES,
THERESA CHASE.

Copies of this patent may be obtained for five cents each, by addressing the "Commissioner of Patents, Washington, D. C."